July 8, 1952     C. M. HARRIS     2,602,674

FIFTH WHEEL STABILIZING DEVICE

Filed July 17, 1950

INVENTOR
CHARLES M. HARRIS
BY Liverance and
Van Antwerp
ATTORNEYS

Patented July 8, 1952

2,602,674

UNITED STATES PATENT OFFICE 2,602,674

FIFTH WHEEL STABILIZING DEVICE

Charles M. Harris, Holland, Mich.

Application July 17, 1950, Serial No. 174,157

6 Claims. (Cl. 280—33.05)

This invention relates to a stabilizing device for fifth wheels of the type which are used at the rear ends of motor vehicles, there being detachably connected with the fifth wheel a trailer which when drawn on the road, is carried by wheels engaging the road toward the rear end of the trailer. Such fifth wheel structures have limited turning movements about horizontal axes transverse of the trailers. In the passage over the road, with changing gradients of the road, and also at other times, as when going around curves, such free rocking movement of the fifth wheel is undesirable.

It is a primary object and purpose of the present invention to provide a novel, useful and practical stabilizing means for maintaining the fifth wheel substantially horizontal when a trailer is connected thereto and is being drawn over the road, but which horizontal maintenance mechanism may be readily operated to release the fifth wheel so that it may have rocking movement and tilt to different angles to the horizontal at times when such movement is wanted.

Figure 1:
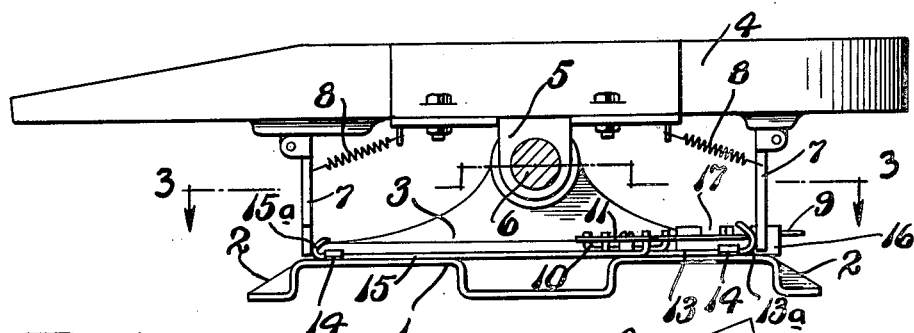

An understanding of the invention may be had from the following description, taken in connection with the accompanying drawing, in which, Fig. 1 is a side elevation of a fifth wheel having my invention applied thereto, one of the supports for the wheel being removed and the shaft about which it rocks being shown in cross section, the fifth wheel being maintained in horizontal position by my invention.

Figure 2:
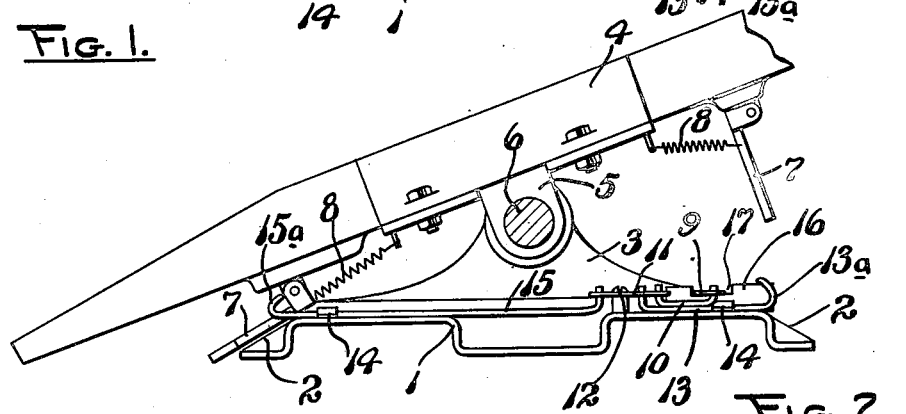
Figure 3:
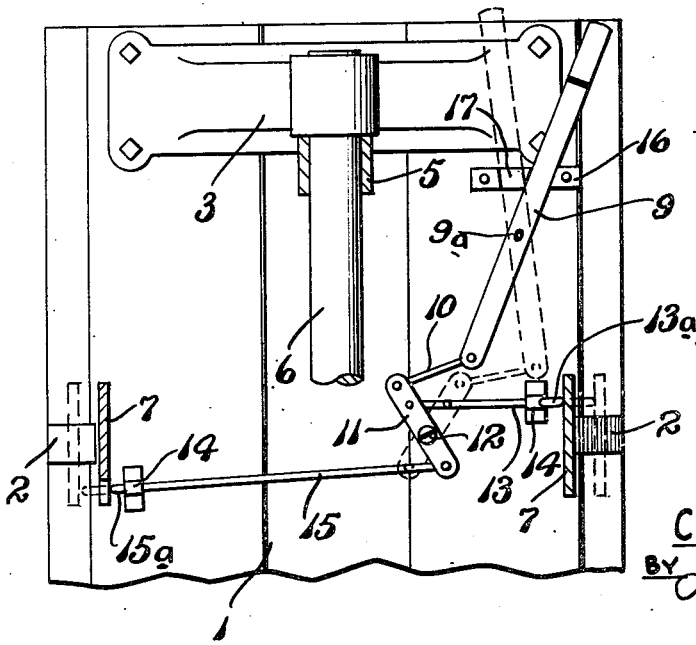

Fig. 2 is a similar view showing the release of the stabilizing device of my invention for permitting the tilting or rocking movement of the fifth wheel and, Fig. 3 is a horizontal section substantially on the plane of line 3—3 of Fig. 1 looking in the direction indicated.

Like reference characters refer to like parts in the different figures of the drawing.

The mounting plate for the fifth wheel is indicated at 1. It is substantially a metallic plate of rectangular outline which is permanently secured toward the rear end and upper side of a motor vehicle of the truck type which is used to pull the trailer. With my invention, at both the front and rear sides of the mounting plate, filler blocks 2 of suitable material may be permanently secured having outer sides disposed at an angle to the horizontal which, in practice, may be an angle of 45 degrees though not necessarily restricted or limited to such angle. At opposite end portions of the mounting plate supporting brackets 3 are permanently secured, over which the fifth wheel 4 of conventional structure is located, having spaced downwardly extending lugs 5 permanent therewith through which and also through the upper portions of the brackets 3 a horizontal shaft 6 extends. This rockingly mounts the fifth wheel for rocking movement about the axis of the shaft 6. Such fifth wheel structure described is conventional and provides the environment where my invention is used.

With my invention, spaced struts 7 are pivotally connected at their upper portions to the fifth wheel at the under sides thereof, one at the front and one at the back of the shaft 6. They are normally held in a vertical position by tension springs 8 as shown. In such position their lower ends are slightly above the mounting plate, which plate interposes a stop against the fifth wheel turning about the axis of the shaft 6, as shown in Fig. 1.

A hand lever 9 is pivotally mounted between its ends, as at 9a, on the mounting plate having the outer end extending substantially to one end of the plate 1. At its inner end a link 10 is pivotally connected thereto at one end and at its opposite end to a lever 11, which is pivotally mounted between its ends at 12 on the mounting plate 1 and is located thereabove.

A rod 13 at its inner end is connected with the lever 11 at one side of and at a predetermined distance from the pivot 12. It extends therefrom toward the front post 7, being slidably guided underneath a guiding clip 14 secured to the plate 1. At its outer end it is preferably turned upwardly into a terminating hook 13a, the bend of which comes to the inner side of the front strut 7 when such strut is in vertical position. A second rod 15 is pivotally connected at its front end to the lever 11 at the opposite side of and preferably at the same distance as the rod 13 from the pivot at 12, extends to the rear over the plate 1 and is held and guided through a second clip 14, terminating at its free rear end in an upturned hook 15a, the bend of which comes against the front side of the rear strut 7 when it is in vertical position.

The handle 9 is manually operable to simultaneously move both rods 13 and 15 to inner retracted position shown in Figs. 1 and 3. Under such circumstances, the struts 7 will be drawn to their vertical positions, as in Fig. 1. By manual operation the lever 9 may be swung counterclockwise (Fig. 3) to the dotted line position, whereupon the rods 13 and 15 are brought at their ends 13a and 15a against the inner sides of the struts 7 and force them outwardly at their lower ends beyond the side edges of the mounting plate 1 and to and directly over the blocks 2 at their inclined outer faces. When thus moved, the fifth wheel may tilt or turn about the axis of the shaft 6. For example in Fig. 2, with the fifth wheel tilted downwardly and to the rear, the lower end of the post 7 riding against the upper inclined side of the adjacent member 2 will pass down such inclined side and the tilting of the fifth wheel may continue, the associated spring 8 being stretched and extended. It will be noted that the strut 7 at the rear of the fifth wheel has a portion thereof cut out at the edge where the end 15a of rod 15 engages (Fig. 1) so that when the fifth wheel plate is tilted, for example, from a horizontal position shown in Fig. 1 to that in Fig. 2, the lowering of the wider portion of the adjacent strut 7 brings such end 15a to the narrowed portion and permits it to pass by the associated strut 7 which it could not do if such strut 7 was of uniform width like the one at the front.

The lever 9 outwardly from the pivot 9a is adapted to have a detachable engagement with a bar 16 which in its upper side is provided with two recesses 17 into which the bar 9 may enter when over either of such recesses. Thus the rods 13 and 15 may be releasably held in either inner or outer positions, one shown in Fig. 1 and the other in Fig. 2. When in the position shown in Fig. 2 the fifth wheel is free to rock about the axis of the shaft 6, but when in the position shown in Fig. 1 (also in Fig. 3) the struts 7, because engaging at their lower ends against the mounting plate 1, maintain the fifth wheel in a substantially horizontal position, and it will not change such position until the struts 7 have been moved beyond the front and rear parts of the mounting plate with which they engage when in their vertical operative position.

It is of course apparent that one of the rods, for example the rod 13 and the post or strut 7 which is actuated thereby, could be removed or eliminated, leaving the other rod 15 which would prevent the tilting of the fifth wheel from its horizontal position in one direction only. The invention, therefor, is not necessarily restricted to the use of both of the struts 7 though preferably both are used.

The structure described is readily applied to the mounting plates and fifth wheels either in conjunction with new structures, or with those already installed and out in use. The structure is readily manufactured, and is sure and certain in the performance of the operations and functions for which it has been designed.

The invention is defined in the appended claims and is to be considered comprehensive of all forms of structure coming within their scope.

I claim:

1. A fifth wheel, a mounting plate below the wheel, means for mounting the fifth wheel thereon to rock about a horizontal axis carried transversely of the mounting plate, a strut pivotally connected at the under side of the fifth wheel to a side of said axis, yielding means normally moving the strut to a vertical position, in which position its lower end is over an edge portion of the mounting plate, a movable member mounted on the mounting plate having an end substantially in contact with the lower end of the strut, and manually operable means for moving said member against the strut beyond the mounting plate, whereby the fifth wheel may tilt to angular positions.

2. A structure as defined in claim 1, a second strut pivotally connected to and depending from the fifth wheel at the opposite side of said axis, yielding means for moving it to vertical position, in which position its lower end is over the opposite edge portion of the mounting plate, a second movable member mounted on said mounting plate to engage said strut, and connections whereby said first and second movable members are simultaneously manually operated to move both of said struts beyond the edge portions of said mounting plate.

3. A structure as defined in claim 1, said mounting plate having a member with a downwardly inclined side located adjacent the lower end of said strut below it, against which inclined side the lower end of the strut rides when the fifth wheel is tilted in a direction to lower the fifth wheel at the portion thereof to which the strut is connected.

4. In a structure as described, a horizontal mounting plate, a fifth wheel located over said mounting plate, a rock shaft carried by the mounting plate transversely thereof on which said fifth wheel is mounted for rocking movement about a horizontal axis, a strut pivotally connected at its upper end to the fifth wheel, extending downwardly substantially to the mounting plate and at its lower end closely approaching said mounting plate at an adjacent edge thereof, yielding means normally holding the strut in vertical position, a rod slidably mounted on the mounting plate having an outer end adapted to engage against said strut at its inner side and adjacent its lower end, a hand lever pivotally mounted on said mounting plate, and connections between said rod and hand lever for moving said bar longitudinally against said strut to move it, at its lower end, beyond the portion of the mounting plate over which it is normally located, whereby the fifth wheel is freed for tilting movement.

5. A structure as defined in claim 4, a second strut similarly mounted at the under side of and depending from said fifth wheel at the opposite side of the shaft, yielding means normally holding the strut in vertical position with its lower end in close proximity to the opposite side of the mounting plate and over said plate, a second rod slidably mounted on said mounting plate having an end adapted to engage said second strut near its lower end and at its inner side, a lever pivotally mounted between its ends at the upper side of the mounting plate to which, at opposite sides of the pivot of said lever, the other ends of said rods are connected and a link connection between said hand lever and one end of said last mentioned lever.

6. A structure as defined in claim 5, and a bar secured to the upper side of the mounting plate over which said hand lever is movable, said bar having two spaced recesses, each adapted to receive said hand lever for maintaining the hand lever and parts connected therewith in either of two extreme positions.

CHARLES M. HARRIS.

REFERENCES CITED

The following references are of record in the file of this patent:

UNITED STATES PATENTS

| Number | Name | Date |
|---|---|---|
| 1,892,797 | Davis | Jan. 3, 1933 |
| 2,066,430 | Swift | Jan. 5, 1937 |
| 2,291,626 | Huber | Aug. 4, 1942 |
| 2,391,372 | Weigand | Dec. 18, 1945 |

FOREIGN PATENTS

| Number | Country | Date |
|---|---|---|
| 245,559 | Switzerland | July 16, 1947 |